United States Patent
Kim et al.

(10) Patent No.: US 8,346,393 B2
(45) Date of Patent: Jan. 1, 2013

(54) CONTROL APPARATUS OF MULTI-FINGER HAND AND GRASPING METHOD USING THE SAME

(75) Inventors: Ji Young Kim, Seoul (KR); Jong Do Choi, Gyeonggi-do (KR); Hyun Kyu Kim, Seoul (KR); Kyung Won Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 476 days.

(21) Appl. No.: 12/654,166

(22) Filed: Dec. 11, 2009

(65) Prior Publication Data

US 2010/0161130 A1 Jun. 24, 2010

(30) Foreign Application Priority Data

Dec. 18, 2008 (KR) .................. 10-2008-0129600
Nov. 19, 2009 (KR) .................. 10-2009-0111770

(51) Int. Cl.
*B25J 15/08* (2006.01)
*G05D 17/02* (2006.01)

(52) U.S. Cl. ..................... 700/261; 901/30
(58) Field of Classification Search .......... 700/245, 700/251, 260–262; 901/30–36, 39
See application file for complete search history.

(56) References Cited

U.S. PATENT DOCUMENTS

| | | | | |
|---|---|---|---|---|
| 4,834,761 A | * | 5/1989 | Walters | 623/26 |
| 4,957,320 A | * | 9/1990 | Ulrich | 294/106 |
| 5,501,498 A | * | 3/1996 | Ulrich | 294/106 |
| 6,918,622 B2 | * | 7/2005 | Kim et al. | 294/106 |
| 7,445,260 B2 | * | 11/2008 | Nihei et al. | 294/106 |
| 7,556,299 B2 | * | 7/2009 | Koyama | 294/106 |
| 7,795,832 B2 | * | 9/2010 | Kawabuchi et al. | 318/568.11 |
| 2008/0114491 A1 | * | 5/2008 | Takahashi | 700/245 |
| 2009/0069942 A1 | * | 3/2009 | Takahashi | 700/260 |
| 2010/0138039 A1 | * | 6/2010 | Moon et al. | 700/245 |

* cited by examiner

*Primary Examiner* — Khoi Tran
*Assistant Examiner* — Jason Holloway
(74) *Attorney, Agent, or Firm* — Staas & Halsey LLP

(57) ABSTRACT

A grasping method of a multi-finger hand including calculating positions of tips of plural actual fingers; calculating positions of tips of plural virtual fingers using the calculated positions of the tips of the plural actual fingers; judging that a central position among the calculated positions of the tips of the plural virtual fingers is a central position of a virtual object based on the calculated positions of the tips of the plural virtual fingers; and controlling joint torques of the respective actual fingers corresponding to the tips of the virtual fingers such that motions of the tips of the plural virtual fingers are carried out while uniformly maintaining the relative positional relationships of the tips of the plural virtual fingers based on the central position of the virtual object.

14 Claims, 10 Drawing Sheets

FIG. 7

| GRASPING POSE | VF1 | VF2 (mapping) | VF3 | OBJECT |
|---|---|---|---|---|
| 1 | THUMB | INDEX FINGER (INDEX FINGER) | — | PEN |
| 2 | THUMB | INDEX FINGER / MIDDLE FINGER / RING FINGER (CENTRAL POSITION) | — | MOBILE PHONE |
| 3 | THUMB | INDEX FINGER / MIDDLE FINGER / RING FINGER (CENTRAL POSITION) | — | DISH, BOOK |
| 4 | PALM | INDEX FINGER / MIDDLE FINGER / RING FINGER (CENTRAL POSITION) | THUMB | BALL |
| 5 | PALM | INDEX FINGER / MIDDLE FINGER / RING FINGER (MIDDLE FINGER) | THUMB | POT, GLASS BOTTLE |
| 6 | PALM | INDEX FINGER / MIDDLE FINGER / RING FINGER (MIDDLE FINGER) | — | BROOMSTICK |

O : TIP OF ACTUAL FINGER
◯ : TIP OF VIRTUAL FINGER

○ : TIP OF ACTUAL FINGER
◯ : TIP OF VIRTUAL FINGER

CONTROL APPARATUS OF MULTI-FINGER HAND AND GRASPING METHOD USING THE SAME

CROSS-REFERENCE TO RELATED APPLICATIONS

This application claims the benefit of Korean Patent Application Nos. 2008-0129600, filed on Dec. 18, 2008, and 2009-111770, filed on Nov. 19, 2009, in the Korean Intellectual Property Office, the disclosure of which is incorporated herein by reference.

BACKGROUND

1. Field

Embodiments relate to a control apparatus of a multi-finger hand of a robot, which has multiple fingers with multiple joints to grasp an object, and a grasping method using the same.

2. Description of the Related Art

Substantial research into robot fingers, which perform delicate operations like a human being, has conventionally been conducted. Particularly, much research into the location of tips of robot fingers at desired positions or the control of force applied to the tips to a desired degree has been conducted. Further, a multi-finger hand to stably grasp an object having a designated shape is now being researched.

Considerable research into grasping of an object by robot fingers is underway. In researching grasping of an object by robot fingers, a primary concern is how to stably grasp an object in a desired shape, i.e., a method of causing the robot fingers to approach the object such that the robot fingers smoothly grasp the object without inclination of the object.

In case of a multi-finger hand of a robot grasps an object, trajectory instructions of tips of respective fingers are input to a control apparatus, which considers a grasping state, calculates trajectories of the tips of the fingers and performs overall control of the multi-finger hand.

After positions of the tips of the respective fingers of the multi-finger hand are input to the control apparatus by the instructions, position instructions of the respective finger joints to grasp the object should be calculated and then input. Further, when the number of the fingers is increased, the number of the position instructions of the tips of the fingers to be input is increased. Moreover, when the multi-finger hand is moved, the number of variables to designate the motion is large and thus it is difficult to manipulate the multi-finger hand. For example, in the case where the multi-finger hand includes four fingers, each of which has three joints, twelve joint variables should be designated although simple joint angles are controlled. Further, in the case where the multi-finger hand grasps the object or moves or rotates the grasped object, it is necessary to simultaneously move the plural fingers in consideration of the relative motions of the respective fingers, and thus it is difficult to instruct an intuitive motion.

Therefore, it is recently assumed that there is a virtual object connected to the tips of the respective fingers of the multi-finger hand by virtual springs. Here, it is assumed that the virtual object is connected to a virtual desired object by a virtual spatial spring. Coordinates of the tips of the respective fingers of the multi-finger hand contacting the virtual object are defined, and the tips of the respective fingers move to a central position of the coordinates of the tips of the respective fingers, thereby achieving control of the grasping force of the object and manipulation of the multi-finger hand.

As described above, since the tips of the respective fingers move only to the central position of the coordinates of the tips of the respective fingers, there is a limit to achievement of various grasping methods, such as holding a cylindrical object with fingers and a palm or supporting of a flat object, such as a tray, on spread fingers.

SUMMARY

Therefore, one aspect is to provide a control apparatus of a multi-finger hand, which employs the concept of virtual fingers and thus grasps objects having various shapes by a comparatively easy and simple method, and a grasping method using the same.

In accordance with one aspect, a grasping method of a multi-finger hand includes calculating positions of tips of plural actual fingers, calculating positions of tips of plural virtual fingers using the calculated positions of the tips of the plural actual fingers, judging that a central position among the calculated positions of the tips of the plural virtual fingers is a central position of a virtual object based on the calculated positions of the tips of the plural virtual fingers, and controlling joint torques of the respective actual fingers corresponding to the tips of the virtual fingers such that motions of the tips of the plural virtual fingers are carried out while uniformly maintaining the relative positional relationships of the tips of the plural virtual fingers based on the central position of the virtual object.

In the calculation of the positions of the tips of the plural actual fingers, the tips of the plural actual fingers may include at least two of a thumb, an index finger, a middle finger, a ring finger, a little finger, and a palm.

In the judgment that the central position among the calculated positions of the tips of the plural virtual fingers is the central position of the virtual object, at least one of the positions of the tips of the plural virtual fingers may be determined as a central position among at least two of the positions of the tips of the plural actual fingers.

In the judgment that the central position among the calculated positions of the tips of the plural virtual fingers is the central position of the virtual object, at least one of the positions of the tips of the plural virtual fingers may be determined to be equal with any one of the positions of the tips of the plural actual fingers.

In the control of the joint torques of the respective actual fingers, the relative positional relationships of the tips of the plural virtual fingers based on the central position of the virtual object may be relative distances of vectors between the central position of the positions of the tips of the plural virtual fingers and the positions of the tips of the plural virtual fingers.

In the control of the joint torques of the respective actual fingers, the joint torques may be controlled such that the motion of the tip of a first virtual finger of the plural virtual fingers, which are determined by the tips of at least two actual fingers, is carried out while uniformly maintaining the relative positional relationships of the tips of the actual fingers corresponding to the tip of the first virtual finger based on the position of the tip of the first virtual finger.

In accordance with a further aspect, a control apparatus of a multi-finger hand includes a grasp control unit calculating positions of tips of plural actual fingers, calculating positions of tips of plural virtual fingers using the calculated positions of the tips of the plural actual fingers, judging that a central position among the calculated positions of the tips of the plural virtual fingers is a central position of a virtual object based on the calculated positions of the tips of the plural virtual fingers, and controlling joint torques of the respective actual fingers corresponding to the tips of the virtual fingers such that motions of the tips of the plural virtual fingers are carried out while uniformly maintaining the relative positional relationships of the tips of the plural virtual fingers based on the central position of the virtual object, and a grasp execution unit adjusting the joint torques of the respective actual fingers corresponding to the tips of the plural virtual fingers by the grasp control unit.

In accordance with another aspect, a grasping method of a multi-finger hand includes calculating positions of tips of plural actual fingers, calculating positions of tips of plural virtual fingers using the calculated positions of the tips of the plural actual fingers, judging that a central position among the calculated positions of the tips of the plural virtual fingers is a central position of a virtual object based on the calculated positions of the tips of the plural virtual fingers, and controlling joint torques of the respective actual fingers such that a motion of the central position of the virtual object is achieved as if the central position of the virtual object were connected to a target central position of the virtual object by a virtual spatial spring, motions of the tips of the plural virtual fingers are achieved as if the tips of the plural virtual fingers were connected by virtual springs based on the central position of the virtual object, and motions of the tips of the plural actual fingers are achieved as if the tips of the plural virtual fingers were connected to the corresponding tips of the plural actual fingers by virtual spatial springs.

Additional aspects and/or advantages will be set forth in part in the description which follows and, in part, will be apparent from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings in which:

FIG. 7 is a view illustrating several grasping poses, to which virtual fingers are applied, in the control apparatus in accordance with the embodiment;

DETAILED DESCRIPTION

Figure 1:
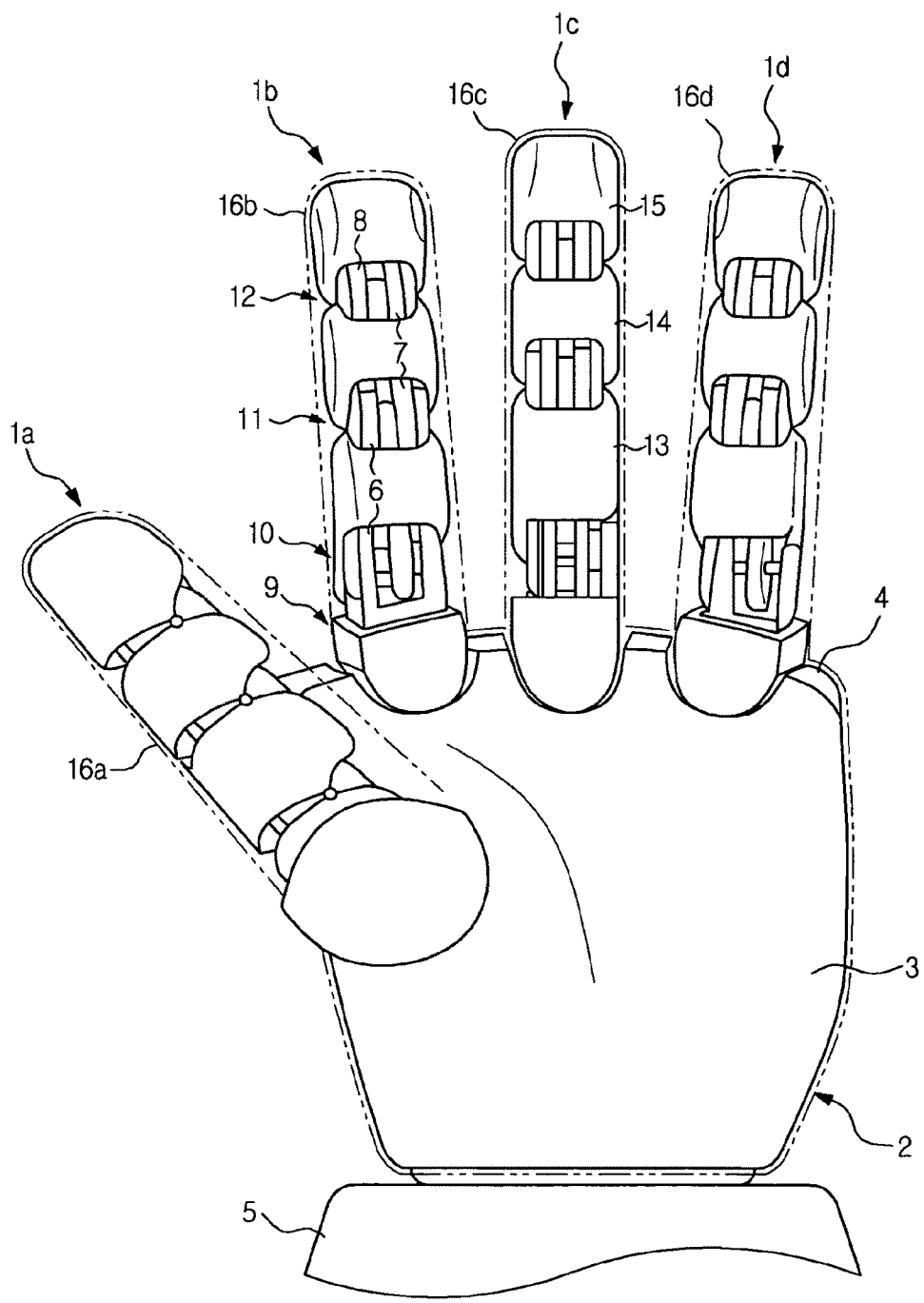
FIG. 1 is a plan view of the palm of a multi-finger hand applied to a multi-finger hand control apparatus in accordance with one embodiment.

Reference will now be made in detail to the embodiments, an example of which is illustrated in the accompanying drawings, wherein like reference numerals refer to like elements throughout.

As shown in FIG. 1, a multi-finger hand applied to a multi-finger hand control apparatus in accordance with one embodiment of the present invention includes four finger units 1a, 1b, 1c, and 1d, extended from a base unit 2, in the same manner as a human hand. The finger units 1a, 1b, 1c, and 1d respectively correspond to a thumb, an index finger, a middle finger, and a ring finger of the human hand.

The base unit 2 is formed by assembling a palm forming member 3 and a back forming member 4, and a space between the palm forming member 3 and the back forming member 4 forms a receiving part to receive driving units to respectively operate the finger units 1a, 1b, 1c, and 1d. One end of the base unit 2 is connected to an arm 5 of a robot.

Each of the respective finger units 1a, 1b, 1c, and 1d includes three interjoint members 6, 7, and 8, and four joints 9, 10, 11, and 12.

Among the joints 9, 10, 11, and 12 of the finger units 1a, 1b, 1c, and 1d, the joints 9 connected to the palm of the hand are rotatably installed. The finger units 1a, 1b, 1c, and 1d may be spread out right and left by the rotating motion of the joints 9.

The joints 10, 11, and 12 of the finger units 1a, 1b, 1c, and 1d are configured such that they are rotated in the same direction. The interjoint members 6, 7, and 8 are respectively rotated around the shaft centers of the joints 10, 11, and 12. Therefore, the finger units 1a, 1b, 1c, and 1d are bent by the rotating motions of the interjoint members 6, 7, and 8 at the respective joints 10, 11, and 12.

In each of the finger units 1a, 1b, 1c, and 1d, the interjoint member 6 is pressurized into an extended state by a spring, and simultaneously a driving unit using a wire, a pulley, and an electric motor applies rotary force to the interjoint member 6 against pressurizing force of the spring, thereby achieving the bending motion of each of the finger units 1a, 1b, 1c, and 1d.

The outer surfaces of the respective interjoint members 6, 7, and 8 of each of the finger units 1a, 1b, 1c, and 1d are respectively covered with buffering members 13, 14, and 15.

Elastic cover members 16a, 16b, 16c, and 16d respectively cover the outer surfaces of the respective finger units 1a, 1b, 1d, and 1d including the buffering members 13, 14, and 15 such that the elastic cover members 16a, 16b, 16c, and 16d are inserted into or separated from the respective finger units 1a, 1b, 1d, and 1d.

Figure 2:
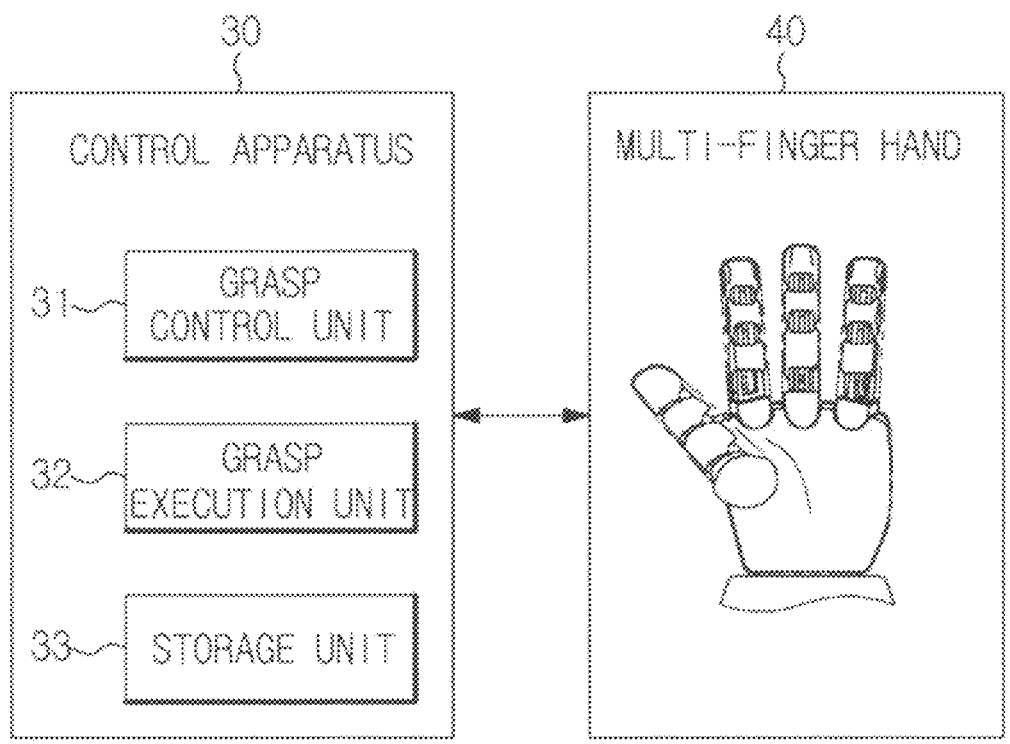
FIG. 2 is a control block diagram of the control apparatus in accordance with the embodiment.

As shown in FIG. 2, a multi-finger hand control apparatus 30 having the above configuration controls the overall grasping operation of a multi-finger hand 40, and the multi-finger hand 40 grasps an object by the control apparatus 30.

The control apparatus 30 includes a grasp control unit 31, a grasp execution unit 32, and a storage unit 33.

The grasp control unit 31 formulates a plan to grasp an object put in the multi-finger hand 40, and transfers a control signal based on the formulated plan to the execution unit 32. The grasp control unit 31 calculates positions of the tips of the respective actual fingers, and sets positions of the tips of virtual fingers using the calculated positions of the tips of the actual fingers. Then, the grasp control unit 31 determines a central position among the positions of the tips of the virtual fingers, and controls joint torques of the respective actual fingers corresponding to the tips of the virtual fingers through the grasp execution unit 32 such that motions of the tips of the virtual fingers are carried out while uniformly maintaining the relative positional relationships of the tips of the virtual fingers based on the central position among the positions of the tips of the virtual fingers.

The grasp execution unit 32 controls the joint torques of the respective actual fingers of the multi-finger hand 40 by the control signal transmitted from the grasp control unit 31.

The storage unit 33 stores various grasp types, to which the virtual fingers are applied.

Figure 3:
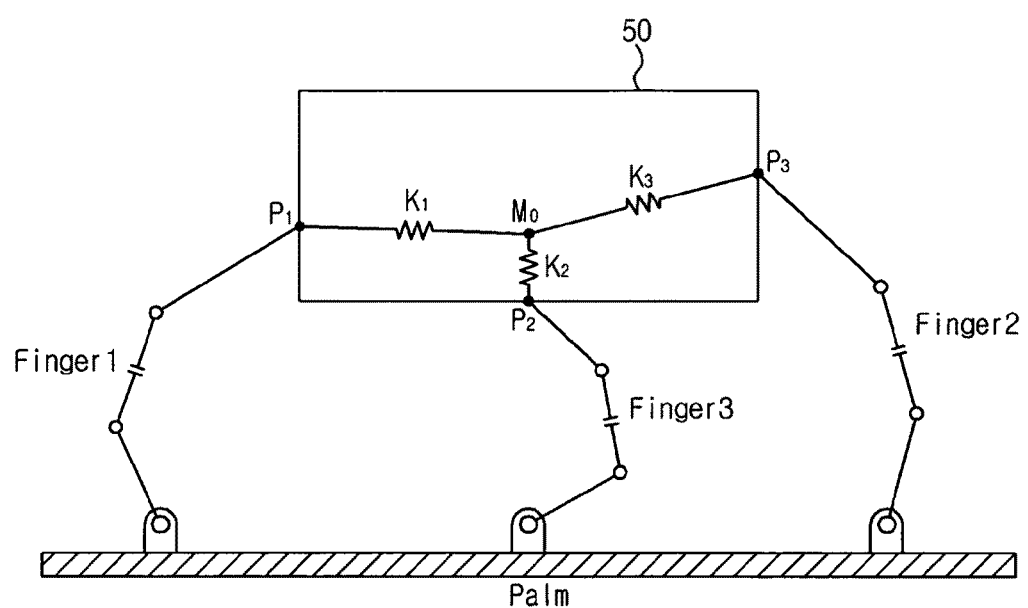
FIG. 3 is a view illustrating positions of tips of respective fingers contacting an object and a central position among the tips of the fingers in the control apparatus in accordance with the embodiment.

As shown in FIG. 3, it is assumed that there is a virtual object 50 in the multi-finger hand 40. Such a virtual object 50 is connected to positions $P_1$, $P_2$, and $P_3$ of the tips of the respective fingers contacting the object 50 by virtual springs $K_1$, $K_2$, and $K_3$. The central position $M_0$ among the positions $P_1$, $P_2$, and $P_3$ of the tips of the respective fingers is located within the virtual object 50. It is assumed that the virtual springs $K_1$, $K_2$, and $K_3$ are respectively provided between the positions $P_1$, $P_2$, and $P_3$ of the tips of the respective fingers and the central position $M_0$ located within the virtual object 50. Therefore, in a case where the multi-finger hand 40 grasps the virtual object 50, a grasping motion is carried out in a direction of causing the positions $P_1$, $P_2$, and $P_3$ of the tips of the respective fingers to approach the central position $M_0$ within the virtual object 50, and thus grasping force is applied to the virtual object 50.

Figure 4:
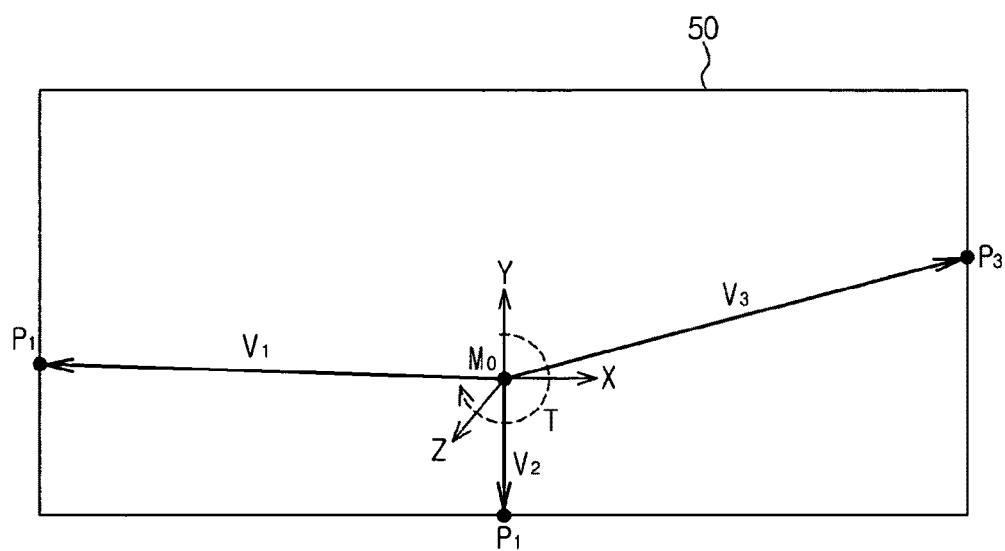
FIG. 4 is a view illustrating the relation between positions and vectors of tips of fingers contacting an object in the control apparatus in accordance with the embodiment.

As shown in FIG. 4, the central position $M_0$ among the positions $P_1$, $P_2$, and $P_3$ of the tips of the respective fingers is located in a working space, and achieves a rotating movement or a translating movement. Vectors $V_1$, $V_2$, and $V_3$ represent relative positional relationships of the tips of the respective fingers to grasp the virtual object 50 based on the central position $M_0$. Here, the tips of the respective fingers move (or achieve the grasping motion) to the central position $M_0$, and thus the virtual object 50 is grasped by the multi-finger hand 40. In a case where the tips of the respective fingers move to the central position $M_0$ located on the object, the relative positional relationships of the respective vectors $V_1$, $V_2$, and $V_3$ are uniformly maintained.

Figure 5:
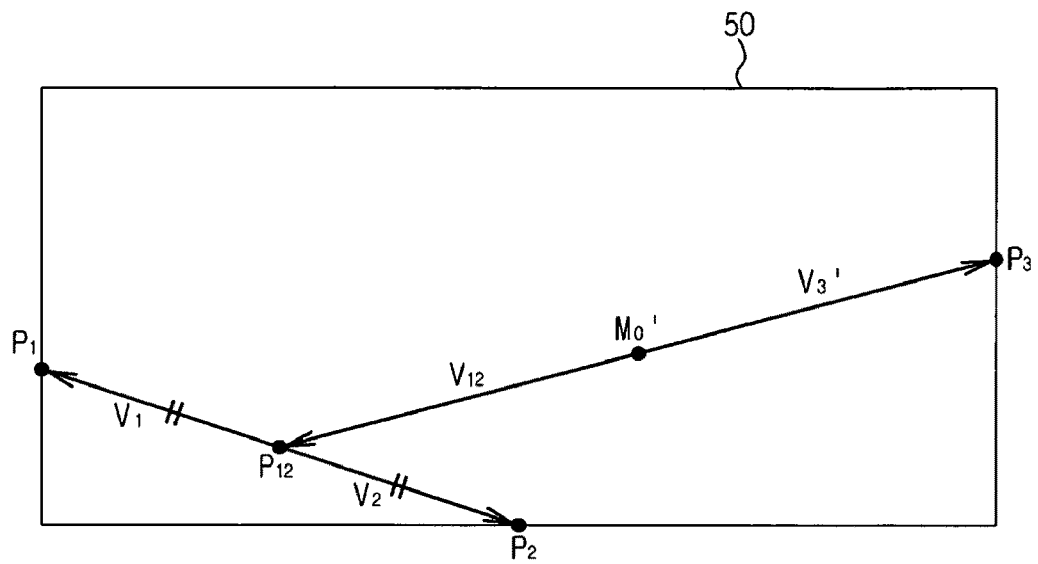
FIG. 5 is a view illustrating conversion of tips of two actual fingers into a tip of one virtual finger in a control apparatus in accordance with one embodiment.

FIG. 5 illustrates conversion of tips of two actual fingers into a tip of one virtual finger in a multi-finger hand control apparatus in accordance with one embodiment of the present invention. As shown in FIG. 5, on the assumption that the positions of the respective actual fingers of the multi-finger hand 40 contacting the virtual object 50 are referred to as $P_1$, $P_2$, and $P_3$, the central position $P_{12}$ between $P_1$ and $P_2$ is calculated. Thereafter, a tip $VF_1$ of a first virtual finger having the central position $P_{12}$ is set, and a tip $VF_2$ of a second virtual finger having the position $P_3$ of the actual finger is set. Here, the tip $VF_1$ of the first virtual finger corresponds to the tips of the two actual fingers two to one, and the tip $VF_2$ of the second virtual finger corresponds to the tip of the one actual finger one to one. Thereafter, the central position $M_{0'}$ between the position of $P_{12}$ of the tip $VF_1$ of the first virtual finger and the position $P_3$ of the tip $VF_2$ of the second virtual finger is calculated.

The tip $VF_1$ of the first virtual finger and the tip $VF_2$ of the second virtual finger move to the central position $M_{0'}$, and thus grasp the virtual object 50. Here, the vectors $V_1$ and $V_2$ represent relative positional relationships of the positions $P_1$ and $P_2$ of the tips of the actual fingers based on the central position $P_{12}$. Further, the vectors $V_{12}$ and $V_{3'}$ represent relative positional relationships of the positions $P_{12}$ and $P_3$ based on the central position $M_{0'}$. In case that the tip $VF_1$ of the first virtual finger and the tip $VF_2$ of the second virtual finger move to the central position $M_{0'}$, the tip $VF_1$ of the first virtual finger and the tip $VF_2$ of the second virtual finger move while uniformly maintaining the relative positional relationships of the respective vectors $V_{12}$ and $V_{3'}$. Simultaneously, in case that the tip $VF_1$ of the first virtual finger moves based on the central position $M_{0'}$, the relating vectors $V_1$ and $V_2$ maintain their relative positional relationships.

Although the above embodiment illustrates that the position $P_{12}$ of the tip $VF_1$ of the first virtual finger is the central position among the positions $P_1$ and $P_2$ of the tips of the two actual fingers, the position $P_{12}$ is not limited thereto but may be a random position biased to any one of the positions $P_1$ and $P_2$ of the tips of the two actual fingers.

Figure 6:
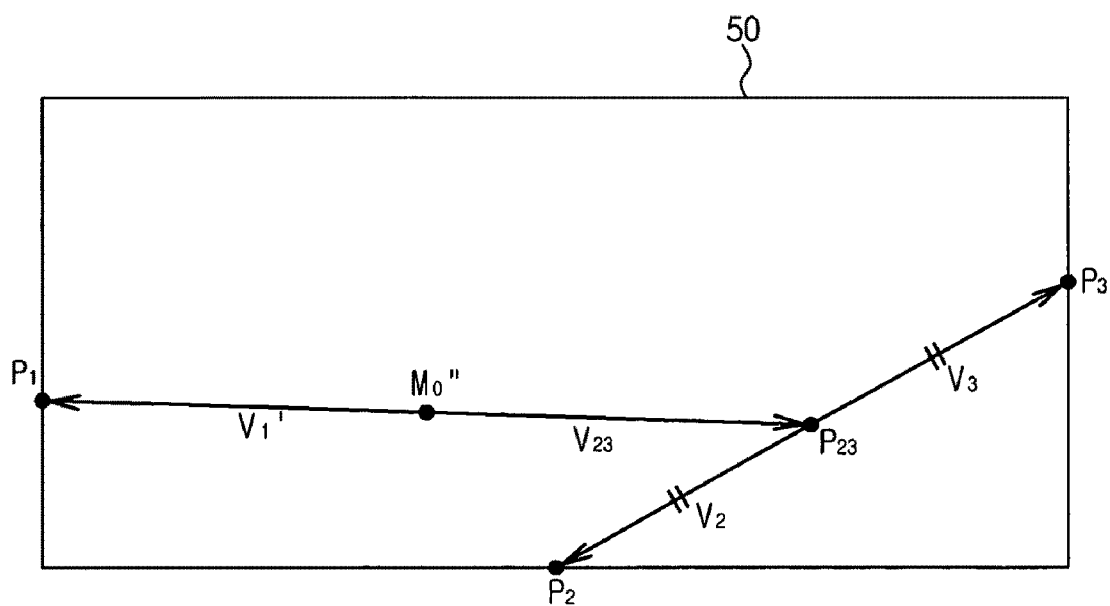
FIG. 6 is a view illustrating conversion of tips of two actual fingers into a tip of one virtual finger in a control apparatus in accordance with another embodiment.

FIG. 6 illustrates conversion of positions $P_2$ and $P_3$ of tips of two actual fingers into a position $P_{23}$ of a tip of one virtual finger in accordance with another embodiment of the present invention. A method of setting virtual fingers in this embodiment is the same as that in the earlier embodiment.

One embodiment proposes a more intuitive grasping plan by employing the concept of virtual fingers. By employing the concept of virtual fingers, four or five fingers may be simply controlled just like two or three fingers, and a wider variety of grasping methods may be achieved than methods obtained by controlling only a virtual object. One embodiment proposes six grasping poses to grasp objects, which are used daily, to achieve various grasping methods. The respective grasping poses relate to virtual fingers. Here, in order to more effectively control the grasp by the multi-finger hand, the multi-finger hand assumes preliminary poses, which are defined in advance, while controlling the respective grasping poses.

FIG. 7 illustrates grasping poses of a multi-finger hand having four fingers to grasp objects. As shown in FIG. 7, in a first grasping pose, one finger in addition to a thumb grasps an object. That is, the thumb and an index finger, the thumb and a middle finger, or the thumb and a ring finger are converted into virtual fingers one to one. For example, the first grasping pose is used to grasp a pen.

In a second grasping pose, two fingers in addition to the thumb grasp an object. That is, the thumb is converted into a first virtual finger $VF_1$, and the two fingers are converted into a second virtual finger $VF_2$. For example, the second grasping pose is used to grasp a mobile phone.

Figure 8:
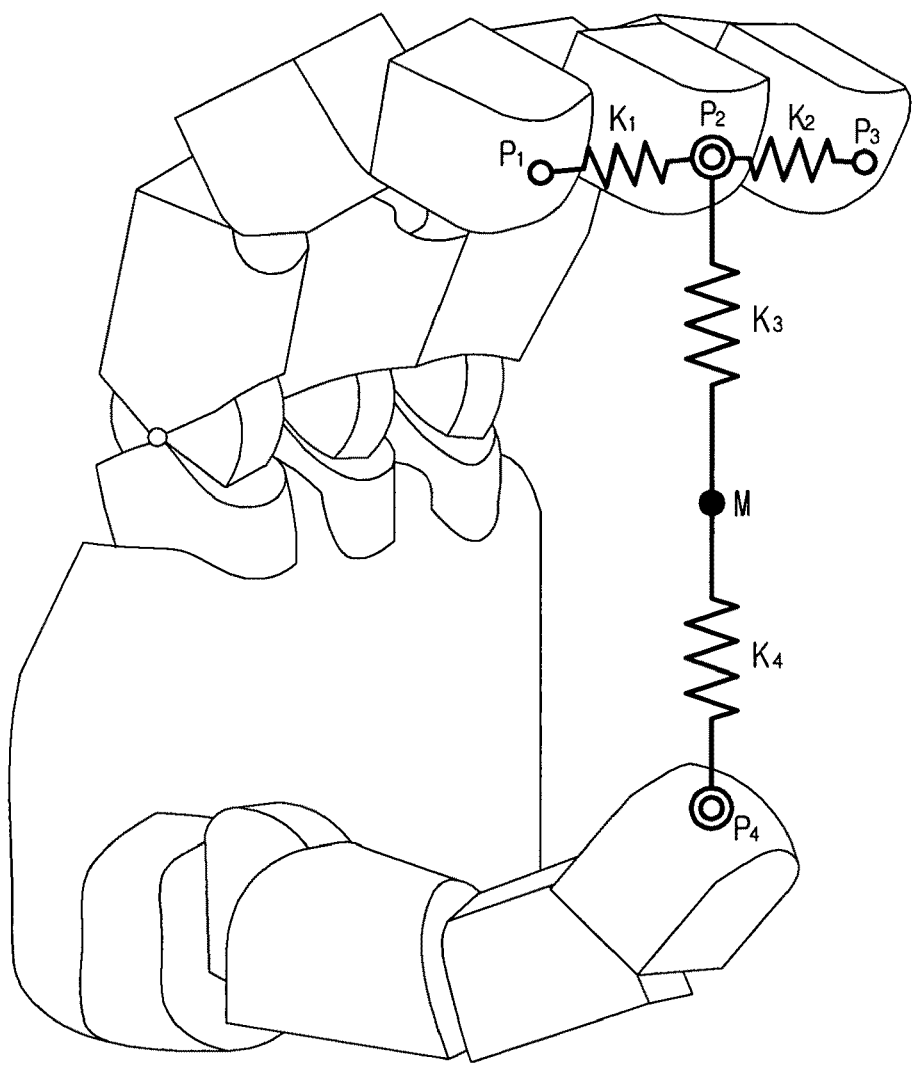
FIG. 8 is a view illustrating a third grasping pose of FIG. 7.

In a third grasping pose, three fingers in addition to the thumb grasp an object. Here, as shown in FIG. 8, the thumb is converted into a first virtual finger $VF_1$, and the three fingers are converted into a second virtual finger $VF_2$. For example, the third grasping pose is used to grasp a dish or a book.

Figure 9:
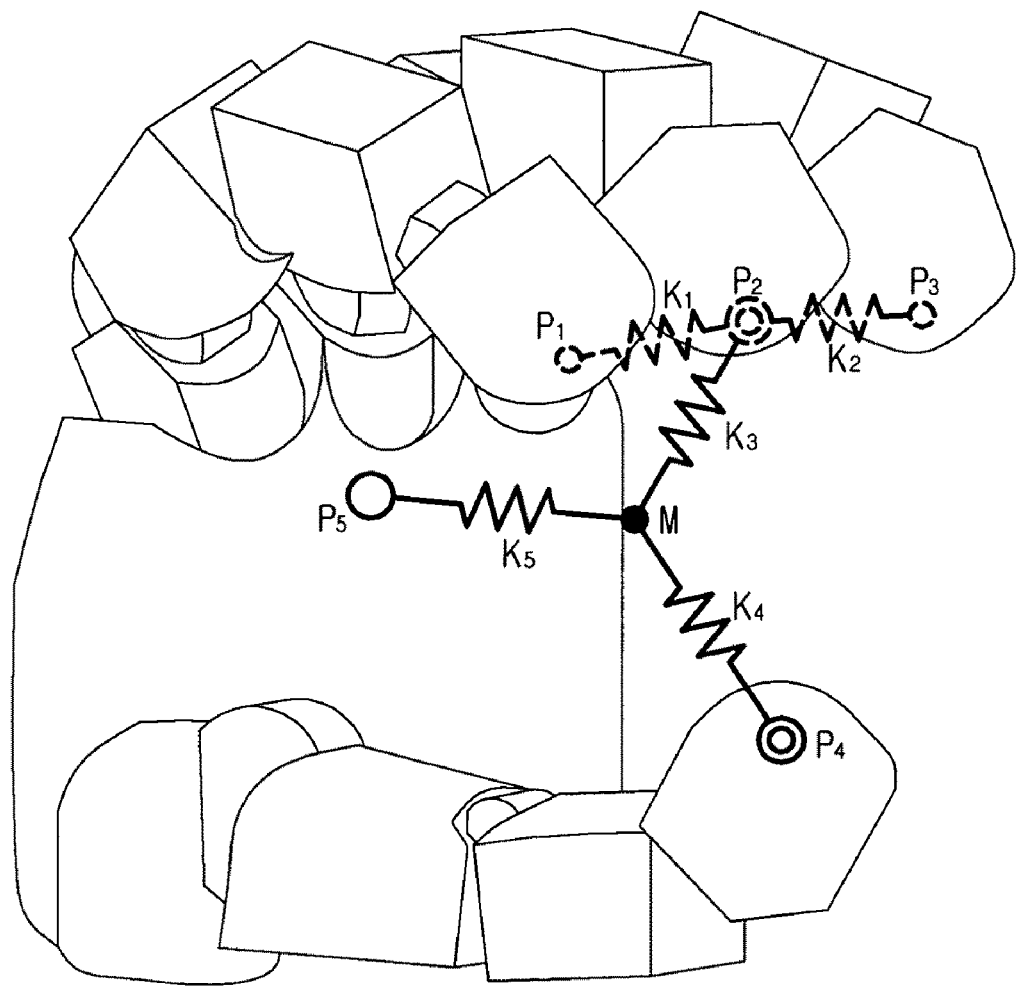
FIG. 9 is a view illustrating a fourth grasping pose of FIG. 7.

In a fourth grasping pose, three fingers in addition to the thumb and the palm of the hand grasp an object. Here, as shown in FIG. 9, the palm of the hand is converted into a first virtual finger $VF_1$, the thumb is converted into a third virtual finger $VF_3$, and the three fingers are converted into a second virtual finger $VF_2$. For example, the fourth grasping pose is used to grasp a ball.

In a fifth grasping pose, three fingers in addition to the thumb and the palm of the hand grasp an object. Here, the palm of the hand is converted into a first virtual finger $VF_1$, the thumb is converted into a third virtual finger $VF_3$, and a specific finger out of the three fingers is converted into a second virtual finger $VF_2$. For example, the fifth grasping pose is used to grasp a pot or a glass bottle.

In a sixth grasping pose, three fingers (except for the thumb) in addition to the palm of the hand grasp an object. Here, the palm of the hand is converted into a first virtual finger $VF_1$, and a specific finger out of the three fingers is converted into a second virtual finger $VF_2$. For example, the sixth grasping pose is used to grasp a broomstick.

Figure 10:
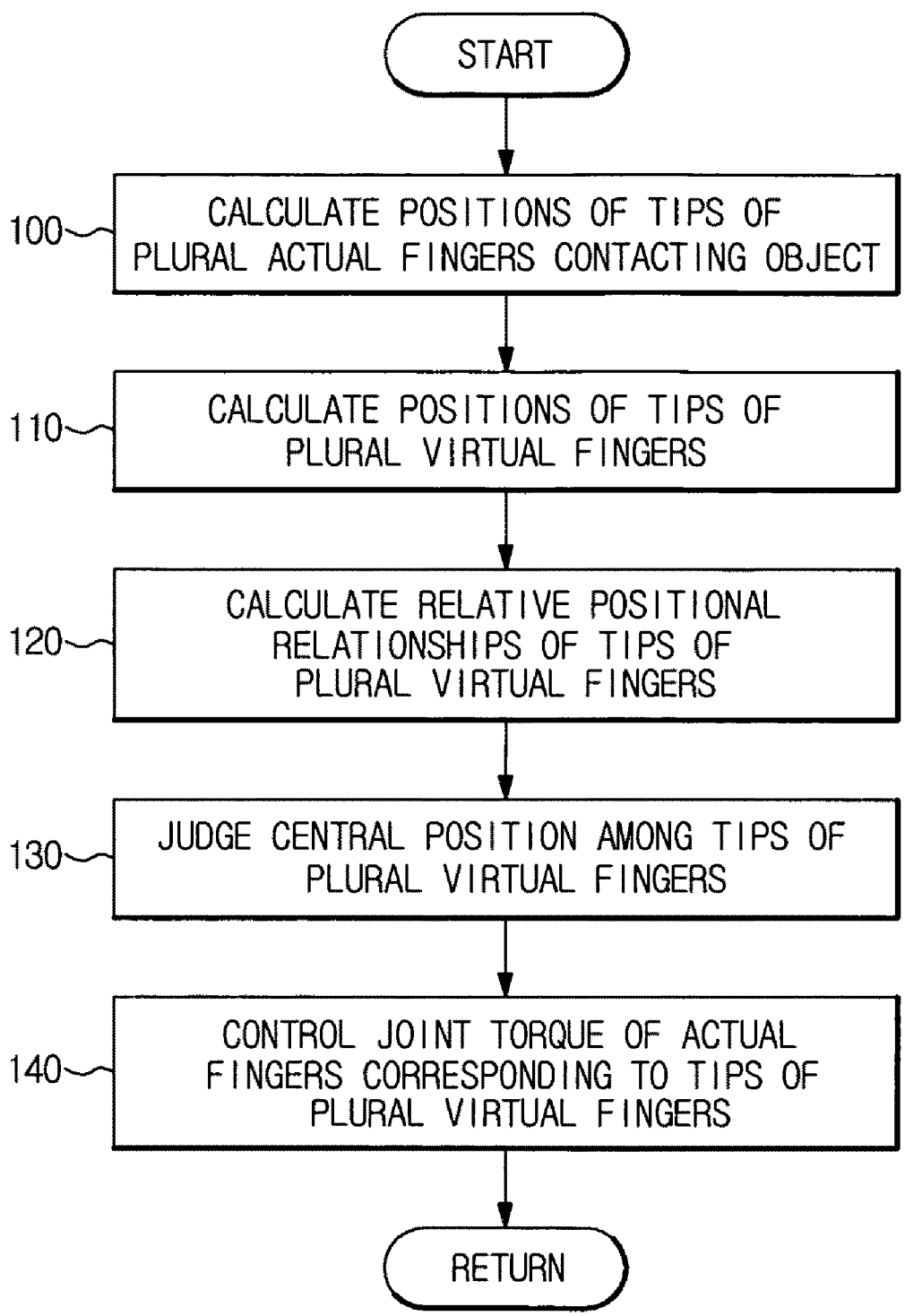
FIG. 10 is a flow chart illustrating a control method of the control apparatus in accordance with the embodiment.

FIG. 10 is a control flow chart of the multi-finger hand control apparatus in accordance with the embodiment. With reference to FIG. 10, the control apparatus 30 calculates positions of tips of respective actual fingers (operation 100). Here, the positions of the tips of the respective actual fingers are calculated using encoders installed on the respective actual fingers.

After the positions of the tips of the respective actual fingers have been calculated, the control apparatus 30 calculates positions of tips of plural virtual fingers using the calculated positions of the tips of the respective actual fingers (operation 110). The tips of the respective actual fingers include the thumb, the index finger, the middle finger, the ring finger, the little finger, and the palm of the human hand. Among these tips of the actual fingers, the tips of at least two actual fingers are defined as one virtual finger. For example, in case that an object is grasped by the thumb, the index finger, the middle finger, and the ring finger, the thumb is defined as a first virtual finger corresponding to the thumb one to one, the remaining three fingers (the index finger, the middle finger, and the ring finger) are defined as a second virtual finger corresponding to the three fingers three to one.

After the positions of the tips of the virtual fingers have been calculated, the control apparatus 30 calculates relative positional relationships of the tips of the virtual fingers (operation 120).

After the relative positional relationships of the tips of the virtual fingers have been calculated, the control apparatus 30 judges that a central position among the positions of the tips of the virtual fingers is a central position of a virtual object (operation 130).

After the judgment that the central position among the positions of the tips of the virtual fingers is the central position of the virtual object has been completed, the control apparatus 30 controls joint torques of the respective actual fingers corresponding to the tips of the virtual fingers such that motions of the tips of the virtual fingers are carried out while uniformly maintaining the relative positional relationships of the tips of the virtual fingers based on the central position of the virtual object (operation 140).

That is, the control apparatus 30 calculates the positions of the tips of the plural actual fingers, and calculates the positions of the tips of the plural virtual fingers using the calculated positions of the plural actual fingers. Thereafter, the control apparatus 30 judges that the central position among the positions of the tips of the virtual fingers is the central position of the virtual object based on the calculated positions of the tips of the plural virtual fingers. Thereafter, the control apparatus 30 controls the joint torques of the respective actual fingers such that a motion of the central position of the virtual object is achieved as if the central position of the virtual object were connected to a target central position of the virtual object by a virtual spatial spring, motions of the tips of the plural virtual fingers are achieved as if the tips of the plural virtual fingers were connected by virtual springs based on the central position of the virtual object, and motions of the tips of the plural actual fingers are achieved as if the tips of the plural virtual fingers were connected to the corresponding tips of the plural actual fingers by virtual spatial springs.

In accordance with the above-described embodiment, by employing the concept of virtual fingers, four or five fingers may be more easily and simply controlled just like two or three fingers, and various grasping methods may be achieved.

Although a few embodiments of the invention have been shown and described, it would be appreciated by those skilled in the art that changes may be made in these embodiments without departing from the principles and spirit of the invention, the scope of which is defined in the claims and their equivalents.

What is claimed is:

1. A grasping method of a multi-finger robot hand comprising:
    calculating positions of tips of plural actual fingers using at least one processor;
    calculating positions of tips of plural virtual fingers using the calculated positions of the tips of the plural actual fingers, wherein at least a position of a tip of a virtual finger of the plural virtual fingers is calculated from at least two positions of the tips of two actual fingers;
    calculating a central position among the calculated positions of the tips of the plural virtual finger; and
    controlling joint torques of the respective actual fingers corresponding to the tips of the virtual fingers such that motions of the tips of the plural virtual fingers are carried out while uniformly maintaining the relative positional relationships of the tips of the plural virtual fingers based on the central position among the calculated positions of the tips of the plural virtual fingers.

2. The grasping method according to claim 1, wherein, in the calculation of the positions of the tips of the plural actual fingers, the tips of the plural actual fingers include at least two of a thumb, an index finger, a middle finger, a ring finger, a little finger, and a palm.

3. The grasping method according to claim 2, wherein, in the judgment that the central position among the calculated positions of the tips of the plural virtual fingers is the central position of the virtual object, at least one of the positions of the tips of the plural virtual fingers is determined as a central position among at least two of the positions of the tips of the plural actual fingers.

4. A grasping method of a multi-finger robot hand comprising:
    calculating positions of tips of plural actual fingers using at least one processor;
    calculating positions of tips of plural virtual fingers using the calculated positions of the tips of the plural actual fingers, wherein at least a position of a tip of a virtual finger of the plural virtual fingers is calculated from at least two positions of the tips of two actual fingers;
    calculating a central position among the calculated positions of the tips of the plural virtual fingers; and
    controlling joint torques of the respective actual fingers corresponding to the tips of the virtual fingers such that motions of the tips of the plural virtual fingers are carried out while uniformly maintaining the relative positional relationships of the tips of the plural virtual fingers based on the central position of the virtual object,
    wherein, in the calculation of the positions of the tips of the plural actual fingers, the tips of the plural actual fingers include at least two of a thumb, an index finger, a middle finger, a rinq finger, a little finger, and a palm, and
    wherein, in the judgment that the central position among the calculated positions of the tips of the plural virtual fingers is the central position of the virtual object, at least one of the positions of the tips of the plural virtual fingers is determined to be equal with any one of the positions of the tips of the plural actual fingers.

5. The grasping method according to claim 1, wherein, in the control of the joint torques of the respective actual fingers, the relative positional relationships of the tips of the plural virtual fingers based on the central position of the virtual object are relative distances of vectors between the central position of the positions of the tips of the plural virtual fingers and the positions of the tips of the plural virtual fingers.

6. The grasping method according to claim 1, wherein, in the control of the joint torques of the respective actual fingers, the joint torques are controlled such that the motion of the tip of a first virtual finger of the plural virtual fingers, which are determined by the tips of at least two actual fingers, is carried out while uniformly maintaining the relative positional relationships of the tips of the actual fingers corresponding to the tip of the first virtual finger based on the position of the tip of the first virtual finger.

7. A multi-finger robot hand system comprising:
plural actual fingers; and
a non-transitory computer readable control apparatus, the control apparatus comprising
a grasp control unit to calculate positions of tips of the plural actual fingers, to calculate positions of tips of plural virtual fingers using the calculated positions of the tips of the plural actual fingers, wherein at least a position of a tip of a virtual finger of the plural virtual fingers is calculated from at least two positions of the tips of two actual fingers; to calculate a central position among the calculated positions of the tips of the plural virtual fingers, and to control joint torques of the respective actual fingers corresponding to the tips of the virtual fingers such that motions of the tips of the plural virtual fingers are carried out while uniformly maintaining the relative positional relationships of the tips of the plural virtual fingers based on the central position among the calculated positions of the tips of the plural virtual fingers; and
a grasp execution unit to adjust the joint torques of the respective actual fingers corresponding to the tips of the plural virtual fingers by the grasp control unit.

8. The multi-finger robot hand system according to claim 7, wherein the tips of the plural actual fingers include at least two of a thumb, an index finger, a middle finger, a ring finger, a little finger, and a palm.

9. The multi-finger robot hand system according to claim 8, wherein the grasp control unit determines at least one of the positions of the tips of the plural virtual fingers as a central position among at least two of the positions of the tips of the plural actual fingers.

10. A multi-finger robot hand system comprising:
plural actual fingers, tips of the plural actual fingers including at least two of a thumb, an index finger, a middle finger, a ring finger, a little finger, and a palm: and
a non-transitory computer readable control apparatus, the control apparatus comprising
a grasp control unit to calculate positions of tips of the plural actual fingers, to calculate positions of tips of plural virtual fingers using the calculated positions of the tips of the plural actual fingers, wherein at least a position of a tip of a virtual finger of the plural virtual fingers is calculated from at least two positions of the tips of two actual fingers; to calculate a central position among the calculated positions of the tips of the plural virtual fingers, and to control joint torques of the respective actual fingers corresponding to the tips of the virtual fingers such that motions of the tips of the plural virtual fingers are carried out while uniformly maintaining the relative positional relationships of the tips of the plural virtual fingers based on the central position among the calculated positions of the tips of the plural virtual fingers; and
a grasp execution unit to adjust the joint torques of the respective actual fingers corresponding to the tips of the plural virtual fingers by the grasp control unit,
wherein the grasp control unit determines at least one of the positions of the tips of the plural virtual fingers as a central position among at least two of the positions of the tips of the plural actual fingers, and
wherein the grasp control unit determines at least one of the positions of the tips of the plural virtual fingers to be equal with any one of the positions of the tips of the plural actual fingers.

11. The multi-finger robot hand system according to claim 7, wherein the relative positional relationships of the tips of the plural virtual fingers based on the judged central position are relative distances of vectors between the central position and the positions of the tips of the plural virtual fingers.

12. The multi-finger robot hand system according to claim 7, wherein the joint torques are controlled such that the motion of the tip of a first virtual finger of the plural virtual fingers, which are determined by the tips of at least two actual fingers, is carried out while uniformly maintaining the relative positional relationships of the tips of the actual fingers used to determine the tip of the first virtual finger based on the position of the tip of the first virtual finger.

13. The multi-finger robot hand system according to claim 7, further comprising a storage unit to store predetermined grasp types, to which the virtual fingers are applied.

14. A grasping method of a multi-finger robot hand comprising:
calculating positions of tips of plural actual fingers using at least one processor;
calculating positions of tips of plural virtual fingers using the calculated positions of the tips of the plural actual fingers, wherein at least a position of a tip of a virtual finger of the plural virtual fingers is calculated from at least two positions of the tips of two actual fingers;
calculating a central position among the calculated positions of the tips of the plural virtual fingers; and
controlling joint torques of the respective actual fingers such that a motion of the central position of the virtual object corresponds to the central position of the virtual object being connected to a target central position of the virtual object by a virtual spatial spring, motions of the tips of the plural virtual fingers corresponds to the tips of the plural virtual fingers being connected by virtual springs based on the central position of the virtual object, and motions of the tips of the plural actual fingers corresponds to the tips of the plural virtual fingers being connected to the corresponding tips of the plural actual fingers by virtual spatial springs.

* * * * *

UNITED STATES PATENT AND TRADEMARK OFFICE
CERTIFICATE OF CORRECTION

PATENT NO. : 8,346,393 B2  
APPLICATION NO. : 12/654166  
DATED : January 1, 2013  
INVENTOR(S) : Ji Young Kim et al.

Page 1 of 1

It is certified that error appears in the above-identified patent and that said Letters Patent is hereby corrected as shown below:

In the Claims:

Column 8; Line 12; In Claim 1, delete "finger;" and insert -- fingers; --, therefor.
Column 8; Line 52; In Claim 4, delete "rinq" and insert -- ring --, therefor.
Column 9; Line 18; In Claim 7, delete "fingers;" and insert -- fingers, --, therefor.
Column 9; Line 44; In Claim 10, delete "palm:" and insert -- palm; --, therefor.
Column 9; Line 53; In Claim 10, delete "fingers;" and insert -- fingers, --, therefor.
Column 10; Line 6; In Claim 10, delete "adiust" and insert -- adjust --, therefor.

Signed and Sealed this  
Fourteenth Day of May, 2013

Teresa Stanek Rea  
*Acting Director of the United States Patent and Trademark Office*